May 9, 1933.  R. W. CLEMMONS  1,908,625
REEL
Filed June 9, 1931  2 Sheets-Sheet 1
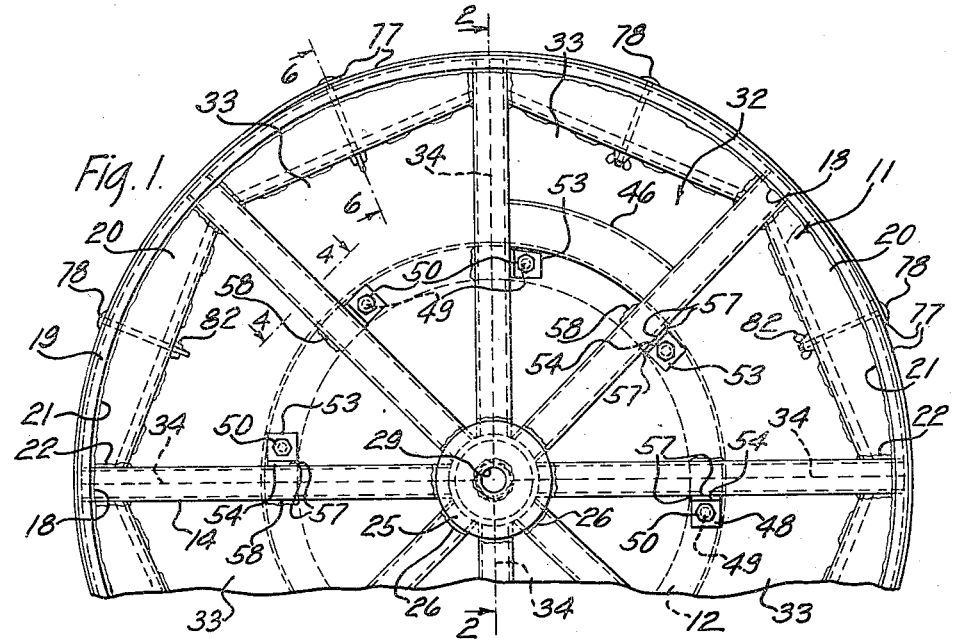
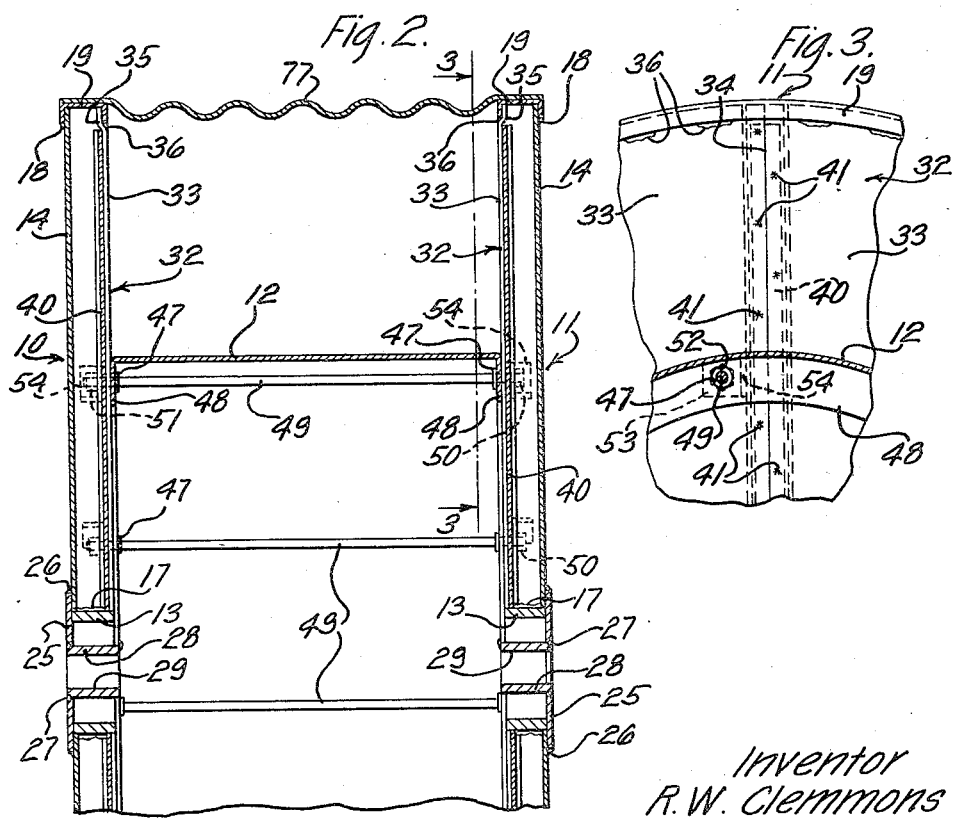
Inventor
R. W. Clemmons
By H. A. Whitehorn Att'y May 9, 1933. R. W. CLEMMONS 1,908,625
REEL
Filed June 9, 1931 2 Sheets-Sheet 2
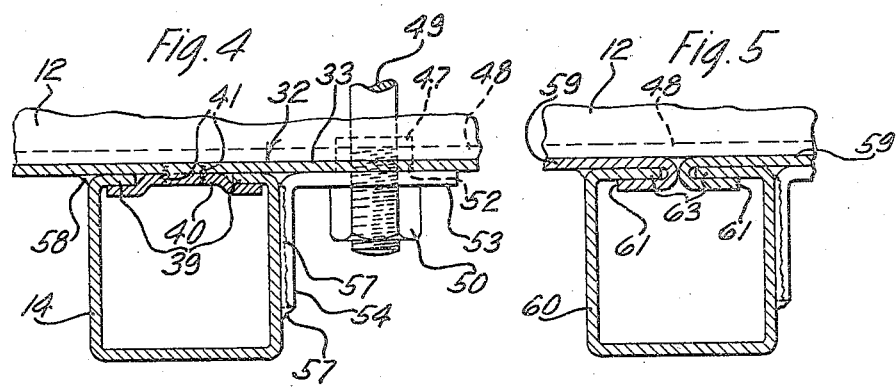
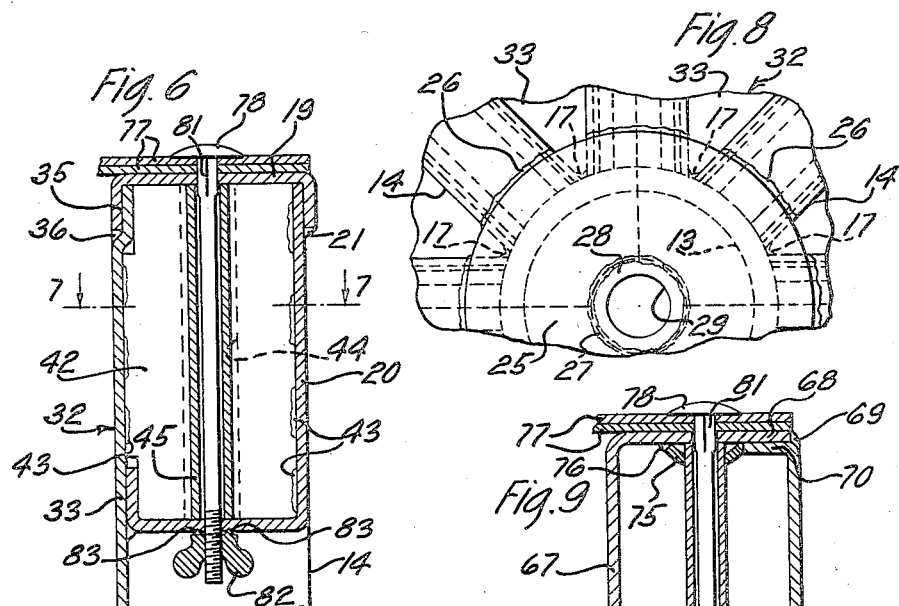
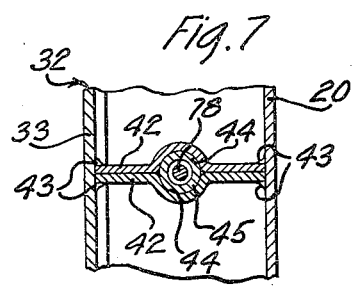
Inventor
R. W. Clemmons
By H. A. Whitehorn Atty Patented May 9, 1933

1,908,625

UNITED STATES PATENT OFFICE

RALPH W. CLEMMONS, OF CHICAGO, ILLINOIS, ASSIGNOR, BY MESNE ASSIGNMENTS, TO WESTERN ELECTRIC COMPANY, INCORPORATED, OF NEW YORK, N. Y., A CORPORATION OF NEW YORK

REEL

Application filed June 9, 1931. Serial No. 543,053.

This invention relates to reels, and more particularly to metallic reels for supporting material, such as telephone cable.

The object of this invention is to provide an improved reel which is simple and rigid in construction, durable in service, and having the greatest degree of strength commensurate with its weight.

In accordance with the general features of this invention, there is provided in one embodiment thereof a reel comprising a pair of heads fastened to flanged ends of a drum, each head being composed of a plurality of radially extending channel members abutting and secured at their inner ends to the periphery of a cylindrical hub member and at their outer ends to a circular shaped channel member. Angle truss elements arranged between the radially extending channel members at their outer ends serve to strengthen the heads, and segmental plates or disks forming the interior surface of the heads are recessed at their outer edges to receive the circular shaped channel member and are welded thereto and to the outer walls of the radially extending channel members. Inwardly turned spaced inner opposite arms of the radially extending channel members are clamped to the segmental plates by clamp plates which extend substantially the entire length of the radially extending channel members and are welded to the segmental plates. An axial bearing plate having welded thereto the outer end of a journal member which is supported at its inner end in an aperture formed in the segmental plates abuts the outer end of the cylindrical hub member and the outer faces of the radially extending channel member to which it is welded.

These and other features and advantages of this invention will become apparent in the following detailed description, reference being had to the accompanying drawings, wherein Fig. 1 is a fragmentary side elevational view of a cable reel embodying the features of this invention;

Fig. 2 is an enlarged fragmentary axial sectional view taken on the line 2—2 of Fig. 1;

Fig. 3 is a fragmentary vertical sectional view taken on the line 3—3 of Fig. 2;

Fig. 4 is an enlarged detail sectional view taken on the line 4—4 of Fig. 1;

Fig. 5 is a modification of the construction illustrated in Fig. 4;

Fig. 6 is an enlarged detail sectional view taken on the line 6—6 of Fig. 1;

Fig. 7 is a plan sectional view taken on the line 7—7 of Fig. 6;

Fig. 8 is an enlarged fragmentary view of Fig. 1 showing in detail the construction of the reel adjacent the hub thereof, and Fig. 9 is a modification of the construction illustrated in Fig. 6.

Referring now to the drawings wherein like reference characters refer to similar parts throughout the several views, particular reference being had first to Figs. 1, 2 and 3, the improved reel comprises a pair of metal heads 10 and 11, spaced apart by a flanged metal drum 12. The construction of the two heads is the same except as may be pointed out hereinafter and therefore only one head will be described in detail for the sake of simplifying the disclosure. Each of the heads comprises a cylindrical hub member 13 to which is secured a plurality of radially extending ribs 14 in the form of channel shapes, the inner end edges of which abut the periphery of the hub member 13 and are welded thereto, as indicated at 17 (Figs. 2 and 8). At their outer ends the ribs 14 are welded as indicated at 18 (Figs. 1 and 2) to a circular channel shape 19. Arranged between the ribs 14 are angle shapes 20 having their outer edges shaped to conform to the curvature of the circular channel shape 19, the angle shapes being welded to the circular channel shape at 21 and to the ribs 14 at 22 and serve to reinforce the reel heads by acting as trusses between the ribs.

Concentrically arranged with and welded to the outer annular edge of the hub member 13 is an annular plate 25 which is also welded to each of the ribs 14 as indicated at 26 (Figs. 1, 2 and 8). Extending into the aperture of the annular plate 25 and flush with its outer face to which it is welded at 27 is a cylindrical arbor supporting member 28 provided with a round aperture 29 for receiving an arbor (not shown). The internal diameter of the hub member 13 is of sufficient size to allow for considerable variations in the size and shape of the arbor supporting member 28 carried by the plate 25 which may be provided with a round or other suitably shaped aperture of a size to accommodate the particular arbor to be used in supporting the reel.

Side plates 32 of the reel heads abut the flanged ends of the drum 12. The side plates 32 of each head in the embodiment illustrated in Figs. 1, 2 and 3 of the improved reel comprise four segmental plates 33 having their radial edges abutting at a point 34 intermediate the sides of certain of the ribs 14 (Figs. 1 and 3) which are spaced 90° apart. Adjacent their outer edges the plates 33 are recessed or offset as shown at 35 (Figs. 2 and 6) the thickness of the inner flange of the circular channel shape 19 which abuts the faces of the offsets in the plates 32 to provide a comparatively smooth inner surface for the reel head, the plates 33 and the channel shape 19 being secured together as shown at 36 by a continuous or intermittent weld, the latter type of weld being preferably employed when the side plates 32 are of comparatively thin stock to prevent buckling or distortion of the side plates which might occur if a continuous type of weld were used. When it is permissible to use the intermittent type of weld a reduction in the weight and cost of the reel results therefrom. The inner edges of the plates 33 abut the periphery of the arbor supporting member 28 at its inner end to which they are welded. Although each of the side plates 32 in the embodiment illustrated in Figs. 1, 2 and 3 of the improved reel comprises four segmental plates 33, obviously the plates 32 may each be made from a single plate or in some cases more than four plates 33 may be employed for each side plate 32, all depending on the size of the reel, or other factors. The channel shaped ribs 14 are provided with inwardly turned spaced inner opposite arms 39 which are clamped to the segmental side plates 33 by clamp plates 40 which extend substantially the entire length of the ribs 14 (Figs. 2, 3 and 4), the plates 40 being secured to the side plates 33 by staggered spot welding indicated at 41 (Fig. 3).

The angle shapes 20, which as hereinbefore described serve as trusses between the ribs 14, are each strengthened, particularly in a lateral direction, by radially extending abutting plates 42 (Figs. 6 and 7) mounted in the space formed between inner opposed surfaces of the shape 20 and the side plate 32 and the circular channel shape 19 and are intermittently welded as indicated at 43 to inner opposed surfaces of the shape 20 and the side plate 32 at points substantially intermediate the ribs 14 which are welded to opposite ends of the angle shape 20. Longitudinally the plates 42 are each formed with a circular recess 44, the two recesses providing an aperture in which is mounted a tube 45, the purpose of which will be described hereinafter.

A suitable aperture (not shown) is formed in the side plate 32 of the reel head immediately outside the periphery of the drum 12 and between two adjacent ribs 14 through which telephone cable or other material to be coiled upon the reel may be passed and held when it is desired to wind it upon the reel, and when the reel has been wound a removable closure member 46 which is channel-shaped may be mounted in position between the two ribs 14 which serves to cover the aperture and the end of the material and retained in position by suitable means (not shown).

The drum 12 is formed with annular inwardly extending flanges 48 at each end (Fig. 2) which abut the inner faces of the side plates 32 of the reel heads 10 and 11, the heads being held in position against the flanges 48 by a plurality of through bolts 49 which extend through the side plates and the flanges. Each of the bolts 49 is threaded at one end to receive a nut 50 and has a head 51 formed on the opposite end thereof (Figs. 2 and 3). Surrounding each of the bolts 49 at each end where they pass through the side plates 32 and the drum flanges 48 is a bushing 47 which is entered in apertures 52 provided in the side plates and the flanges. The bushings 47 are provided with integral flanges 53 at their outer ends, which abut the outer faces of the side plates 32 and when the nuts 50 are threaded onto the bolts 49 and against the flanges 53, the assembled drum 12 and heads 10 and 11 will be held in a predetermined position. The flanges 53 are formed with right angle arms 54 at one side which are welded to the sides of the adjacent ribs 14 as indicated at 57, while the opposite sides of the ribs are welded to the side plates 32 as indicated at 58, thus further strengthening the assembled side plates 33 and the ribs 14.

In some cases instead of employing the construction shown in detail in Fig. 4 for securing certain of the ribs 14 to the side plates 33, the method illustrated in Fig. 5 may be used, in which segmental shaped side plates 59 extend from one rib 60 to the next rib. The radial edges 61 of the plates 59 are folded over spaced inner edge portions 63 of the ribs 60 along a line intermediate the sides thereof to firmly clamp the associated parts to obtain adequate strength. The inner edge portions 63 of the ribs 60 have less spacing therebetween than the portions 39 of the ribs 14, thus adding rigidity to the interlocking of the ribs with the side plates.

In Fig. 9 is illustrated an alternative form of the structure shown in Fig. 6, wherein a side plate 67, which may comprise a single plate or a plurality of segmental plates, is turned over at its outer periphery to form a circular flange 68, the circular flange taking the place of the circular channel shape 19 of Fig. 6. The flange 68 is welded at its outer edge as indicated at 69 to an inwardly turned flange 70 of an angle shape 71, which like the angle shape 20 of Fig. 6 extends from one rib 14 to the next, serving as a truss therebetween. A tube 74 extends through an aperture in a lower wall of the angle shape 71 a short distance and is welded thereto. Surrounding the tube 74 adjacent its upper end is a cup-shaped washer 75 which is welded around its periphery, as indicated at 76, to the inner surface of the flange 68 of the side plate 67, the washer serving to laterally support the tube 74 and maintain it in a predetermined position.

After the heads 10 and 11 and the drum 12 of the reel, as described hereinbefore, have been assembled and material coiled on the reel it may be desirable to enclose the material wound on the reel with a protecting cover comprising wooden lagging bound in strips or in the form of metallic sheets. The preferred form of enclosing means are metallic sheets 77 corrugated in the direction of their length and curvature, the corrugations being so formed that when the sheets are secured on the heads 10 and 11 by means of nut and bolt assemblies 78 (Figs. 1, 6 and 9), the corrugated portion will be of less diameter than the reel heads so that the weight of the reel will rest on the heads rather than on the corrugated portions of the sheets. The nut and bolt assemblies 78 comprise in each of the structures shown in Figs. 6 and 9 a bolt having a square section 81 (Figs. 6 and 9) adjacent its head, the square section being entered in similarly shaped apertures formed in overlapping ends of the sheets 77 and the circular channel shape 19 in the case of Fig. 6 and the sheets 77 and the flange 68 in the case of Fig. 9. Internally the diameter of the tubes 45 and 74 is such that the square section 81 of the bolt may freely enter. The opposite end of the bolt is formed with a coarse thread, the end of the bolt projecting through an aperture in the lower wall of the angle shape 20 in the case of Fig. 6 and outside the lower end of the tube 74 in the case of Fig. 9. Threaded onto the bolt in each case is a thumb nut 82 having formed thereon a plurality of spaced lugs or locking projections 83 arranged to cooperate with a plurality of similarly spaced depressions formed in the outer surface of the lower wall of the shape 20 and the annular lower end surface of the tube 74 of Figs. 6 and 9, respectively, to lock the nut 82 on the bolt. It will be apparent that the square section 81 of the bolt entered in the correspondingly shaped apertures of the associated parts serves to hold the bolt from rotating when the nut 82 is being tightened and locked in position by the cooperating lugs and depressions. Also in providing a coarse thread on the bolt the nut 82 may be quickly threaded onto and removed from the bolt.

Although in the description herein of the manner of securing together by welding of the various parts of the reel certain parts are described as being secured together by continuous welding, others by intermittent and spot welding, and still other cases by welding without mentioning the type thereof, it will be apparent that the various parts of the reel may be welded together by any suitable well known type of welding and not necessarily in the manner specifically described. Also it is to be understood that the invention is not limited to the specific embodiment described, but is restricted only by the scope of the appended claims.

What is claimed is:

1. In a reel, a head comprising a hub, a head plate secured to the hub, and radially extending channel members secured to the hub, the opposed side arms of said channel members having portions bent parallel to the plane of and secured to the outer surface of the head plate.

2. In a reel, a head comprising a hub, a head plate secured to the hub, and radially extending channel members secured to the hub, the parallel side arms of said channel members having portions bent inwardly and secured to the outer surface of the head plate.

3. In a reel, a head comprising a hub, a plurality of channel shaped radial members secured to the hub, and a head plate provided with bent over portions clamped to the opposed side arms of said radial members.

4. In a reel, a head comprising a hub, segmental head plates secured to the hub, and radially extending channel members secured to the hub and the head plates and overlapping adjoining portions of the plates, the channel members provided with inwardly turned spaced arms abutting the outer surfaces of the plates with radial edges of the plates folded over in clamping relation with the spaced arms of the channel members.

5. In a reel, a head comprising a hub, a head plate secured to the hub, radially extending channel members secured to the hub, the channel members provided with inwardly turned spaced arms abutting the outer surface of the head plate, and plates secured to the outer surface of the head plate between the spaced arms of each of the channel members and overlapping the arms for clamping the channel members to the head plate.

6. In a reel, a head comprising a hub consisting of inner and outer radially spaced annular members, an annular plate interconnecting the annular members at their outer ends, and radially extending members secured to the outer annular hub member and the annular plate.

7. In a reel, a head comprising a hub consisting of inner and outer annular members, an annular plate interconnecting the annular members at their outer ends, a head plate secured to the opposite end of the inner annular hub member, radially extending members secured to the outer annular hub member and the annular plate, and a circular member fixed to the outer ends of the radially extending members.

8. In a reel, a head comprising a hub, a head plate secured to the hub, radially extending members secured to the hub, angle truss elements extending between and secured to the radially extending members with an outer arm thereof flush at its edge with the outer ends of the members and having another arm thereof abutting and secured to the outer surface of the head plate, and radially extending means between and secured to the outer arm of the angle element and the outer surface of the head plate for laterally strengthening the angle element.

9. In a reel, a head comprising a hub, a head plate secured to the hub, radially extending channel members secured to the hub and the head plate, angle truss elements extending between and secured to the channel members and aligned at their outer edges with the outer ends of the members and also the peripheral edge of the plate, an arm of each of the elements abutting and secured to the outer surface of the plate, radially extending plates between and secured at opposite edges to the angle element and the head plate for laterally strengthening the angle elements, and a circular member fixed to the outer ends of the radially extending members and the angle truss elements.

10. A reel comprising spaced heads and a drum, each of said heads comprising a hub, a head plate secured to the hub, radially extending channel members secured to the hub, the opposed side arms of said channel members having portions bent inwardly and secured to the outer surface of the head plate, and a circular member fixed to the outer ends of the radially extending members.

11. A reel comprising spaced heads and a drum, each of said heads comprising a hub, segmental head plates secured to the hub, radially extending channel members overlapping adjoining portions of the head plates secured to the hub, the channel members being provided with inwardly turned spaced arms abutting the outer surfaces of the plates with radial edges of the plates folded over in clamping relation with the spaced arms of the channel members, and a circular member fixed to the outer ends of the radially extending members.

12. In a reel, a head comprising a hub, a head plate secured to the hub provided with an annular peripheral flange extending outwardly, radially extending members secured to the hub abutting and secured to the outer surface of the head plate and to the inner surface of the annular peripheral flange of the plate, and angle truss elements extending between and secured to the radially extending members with opposite end arms thereof abutting and secured to the outer surface of the plate and to the inner surface of the annular peripheral flange of the plate.

13. In a reel, a head comprising a hub, a head plate surrounding the hub, channel members extending radially from the hub, the opposed sides of said members having their free edge portions bent to provide spaced arms for engaging said head plate, and means for securing said arms to said head plate.

14. In a reel, a head comprising a hub, a head plate surrounding the hub, channel members extending radially from the hub, the opposed sides of said members having their free edge portions bent to provide spaced arms for engaging said head plate, and clamping plates secured to said head plate for securing the spaced arms of said members to said head plate.

15. In a reel, a head comprising a hub, members extending radially from the hub, a head plate secured to the members, angle truss elements extending between said members and having an outer arm thereof secured to the members adjacent the outer ends of said members, said elements having another arm secured to the outer surface of said head plate, and means extending between and secured to the outer arm of said element and the outer surface of said head plate for laterally strengthening said element.

In witness whereof, I hereunto subscribe my name this 22nd day of May, A. D. 1931.

RALPH W. CLEMMONS.